United States Patent [19]
Szejtli et al.

[11] Patent Number: 4,535,152
[45] Date of Patent: Aug. 13, 1985

[54] WATER SOLUBLE CYCLODEXTRIN POLYMERS SUBSTITUTED BY IONIC GROUPS AND PROCESS FOR THE PREPARATION THEREOF

[75] Inventors: József Szejtli; Éva Fenyvesi; Béla Zsadon; Mária Szilasi; Lajos Décsei, all of Budapest, Hungary

[73] Assignee: Chinoin, Gyogyszer Es Vegyeszeti Termekek Gyara Rt., Budapest, Hungary

[21] Appl. No.: 580,098

[22] Filed: Feb. 14, 1984

[30] Foreign Application Priority Data

Feb. 14, 1983 [HU] Hungary ................................. 488

[51] Int. Cl.$^3$ ............................................. C08B 37/16
[52] U.S. Cl. ..................................... 536/103; 527/300; 527/310; 527/312
[58] Field of Search ................. 536/103; 527/300, 310, 527/312

[56] References Cited

U.S. PATENT DOCUMENTS

| | | | |
|---|---|---|---|
| 3,414,530 | 12/1968 | Zilkha et al. | 536/103 |
| 3,420,788 | 1/1969 | Solms | 536/103 |
| 3,426,011 | 2/1969 | Parmerter et al. | 536/103 |
| 3,553,191 | 1/1971 | Parmerter et al. | 536/46 |
| 4,228,160 | 10/1980 | Szejtli et al. | 536/103 |
| 4,357,468 | 11/1982 | Szejtli et al. | 536/103 |
| 4,407,795 | 10/1983 | Nicolau | 536/46 |

FOREIGN PATENT DOCUMENTS 1244990  9/1971  United Kingdom ............... 536/103

*Primary Examiner*—Ronald W. Griffin
*Attorney, Agent, or Firm*—Karl F. Ross; Herbert Dubno

[57] ABSTRACT

The invention relates to water soluble cyclodextrin polymers substituted by ionic groups, containing structural units of formula (I)

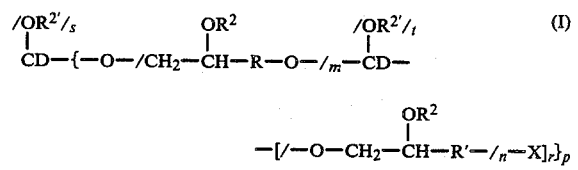

14 Claims, No Drawings

WATER SOLUBLE CYCLODEXTRIN POLYMERS SUBSTITUTED BY IONIC GROUPS AND PROCESS FOR THE PREPARATION THEREOF

FIELD OF THE INVENTION

The invention relates to water soluble cyclodextrin polymers substituted by ionic groups, containing structural units of formula (I)

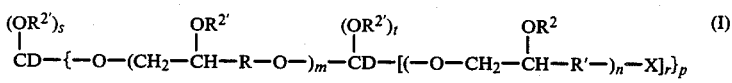

wherein

CD stands for a group obtained from α-, β- or γ-cyclodextrin by cleaving p+s or 1+t+r hydroxy group, R and R' stand independently for —$CH_2$—, —CHOH—$CH_2$—, —$CH_2$—O—$(CH_2)_2$—O—$CH_2$—CHOH—$CH_2$—, —$CH_2$—O—$CH_2$—CHOH—$CH_2$—, —$CH_2$—O—$(CH_2)_4$—O—$CH_2$—CHOH—$CH_2$—, X stands for a secondary or tertiary amino or —$OR^1$ or —$OR^2$, wherein $R^1$ stands for hydrogen or when r is other than O, a group obtained from α-, β- or γ-cyclodextrin by cleaving a hydroxy group, $R^2$ are same or different and stand for hydrogen, —$PO(OH)_2$—, —$SO_2OH$, —$R^3$—$(COOH)_u$, —$R^3$—(—$SO_2OH)_u$, —$R^3$—$(NR^4R^5)_u$, or a group obtained from α-, β- or γ-cyclodextrin by cleaving a hydroxy group or one, two or three $R^2$ substituents together form an $R^3$—$NR^4$—$R^3$— or (—$R^3$—)$_3$N group $R^{2'}$ has the same meaning as $R^2$ except groups obtained from cyclodextrin molecules, $R^3$ stands for u+1 groups obtained from an alkane or an araliphatic hydrocarbon having 1 to 10 carbon atoms, the end carbon atom standing nearer to the polymeric chain of which may be substituted by an oxo group, $R^4$ and $R^5$ stand independently for hydrogen, alkyl having 1 to 4 carbon atoms, optionally substituted by halogen, aryl having 6 to 10 carbon atoms or aralkyl or alkylaryl groups being obtainable by the combination thereof, m and n stand independently for an integer from 1 to 10, r stands for an integer from 0 to 23, p stands for an integer from 1 to 24, s and t stand independently for an integer from 0 to 7, u stands for an integer from 1 to 5, with the proviso, that m, n, r, t and u may vary also in the side-chains within a unit and when CD stands for a group obtained from α-cyclodextrin, then p+s≦18 and r+t≦17 when CD stands for a group obtained from β-cyclodextrin, then p+s≦21 and r+t≦20 and when CD stands for a group obtained from γ-cyclodextrin, then p+s≦24 and r+t≦23.

The object of the present invention is also a process for the preparation of the above cyclodextrin polymers.

The polymers according to the invention contain 2 to 10 cyclodextrin rings, the ionic substituents mentioned above are on the cyclodextrin ring and/or on the chains connecting the cyclodextrin rings. Both the length of the chains and the manner, in which the chains and the cyclodextrin rings are substituted, may vary even within a polymer molecule.

The above polymer products are solid, soluble in water and certain organic solvents, e.g. dimethyl formamide, pyridine, may form not only inclusion complexes but also salts and have a cyclodextrin content of 30 to 70% and an average molecular mass of 2,000 to 15,000.

BACKGROUND OF THE INVENTION

As is known, the cyclodextrins are cyclic, non reducible oligosaccharides containing 6, 7 or 8 glucopyranose units. They may be produced by enzymatic decomposition of starch. In the practice they are mainly used as a consequence of their ability to form inclusion complexes (Szejtli J.: Cyclodextrins and their Inclusion Complexes, Alkadémiai Kiadó, Budapest 1982). The reactivity of the primary and secondary alcoholic hydroxy groups on the rings of the six-member α-, the seven-member β- and the eight-member γ-cyclodextrin renders the preparation of derivatives having great molecular mass (cyclodextrin polymers) possible.

According to the literature cyclodextrin polymers, which are water soluble, and those, which are water insoluble but swell in water, are known. Due to the greater molecular mass and cross-linked structure the latters are not soluble in any solvent.

Water soluble cyclodextrin polymer may be obtained in two way: unsaturated monomer is prepared from cyclodextrin and this will be polymerized (J. Polym.-Sci.Lett. 13, 357 (1975)) or the cyclodextrin is cross-linked with a suitable bifunctional reagent, preferably diepoxy derivative or epichlorohydrin (GB patent specification No. 1,244,990 and Hungarian patent specification No. 180,597).

By both processes products having medium molecular mass may be obtained which may be dissolved in water well and form inclusion complex. The stability of their complexes is generally greater than that of the monomer cyclodextrins. This may be explained by the advantageous steric position of the rings connected each other and in case of β-cyclodextrin by the greater solubility of the polymer (Macromolecules 2, 705 (1976), Proceedings of I. Int. Symp. on Cyclodextrins (1981) 345).

With the known cyclodextrin polymers mentioned above complexes may be produced in many fields, practically in all cases when the molecule to be included, i.e. the so-called "guess molecule" is a neutral group. While complexing salts problems may exist due to the ionic character of the salts. So a cyclodextrin polymer would be advantageous which contains both the acidic and basic substituents capable of forming salts and the cyclodextrin rings capable of forming inclusion complexes. In the literature no such solution is, however, described where the two above mentioned functional units would form a part of a molecule having high molecular weight. Cyclodextrin derivatives, in which the cyclodextrin rings are substituted by several groups capable of forming salts, e.g. carboxyalkyl, sulfoalkyl or aminoalkyl groups, are known (Stärke, 23, 134 (1971), U.S. Pat. No. 3,553,191). These substituted cyclodextrins are not more advantageous than the unsubstituted cyclodextrins since they have relatively low molecular weights.

OBJECT OF THE INVENTION

The object of the present invention is to produce water soluble, modified cyclodextrin polymers which are able not only to form complexes but also salts and so may be applied within broader limits.

DESCRIPTION OF THE INVENTION

It has surprisingly been found that water soluble cyclodextrin polymers containing ionic groups fulfilling the above requirements may be obtained when the cyclodextrin substituted by such ionic groups is polymerized in a manner known per se or the cyclodextrin is substituted by such ionic groups simultaneously with the polymerization or the cyclodextrin polymer, which is not substituted by ionic groups, will be substituted by ionic groups.

The cyclodextrin polymers substituted by ionic groups may be prepared according to the invention in the following ways.

(a) Calculated on 1 mole of the cyclodextrin the α-, β- or γ-cyclodextrin is reacted with 0.1 to 7 moles of a halogen derivative of formula $R^{2''}$—Hal, wherein Hal stands for halogen and $R^{2''}$ has the same meaning as $R^{2'}$ except hydrogen, —$PO(OH)_2$ and —$SO_2OH$, or 0.1 to 7 moles of a sulton derived from a hydroxysulfonic acid of formula HO—$R^3$—$SO_2OH$, wherein $R^3$ has the same meaning as defined above, in the presence of 0.2 to 14 moles of an alkali metal or an alkali-earth metal hydroxide in 0.7 to 1.0 l of water in a manner known per se, the reaction mixture containing the cyclodextrin substituted by ionic groups is reacted calculated on 1 mole of the cyclodextrin contained therein with 5 to 15 moles of epichlorohydrin or a bisepoxy derivative of formula (II)

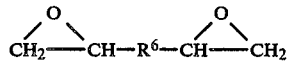

wherein $R^6$ stands for a direct bond or —$CH_2$—O—$CH_2$—, —$CH_2$—O—$CH_2$—$CH_2$—O—$CH_2$— or —$CH_2$—O—$(CH_2)_4$—O—$CH_2$—, after adding 5 to 15 moles of an alkali metal or alkali-earth metal hydroxide and 1.8 to 2.5 l of water at a temperature of from 40° to 80° C.

(b) Calculated on 1 mole of the cyclodextrin the α-, β- or γ-cyclodextrin is reacted with 0.1 to 7 moles of a halogen derviative of formula $R^{2''}$—Hal, wherein $R^{2''}$ and Hal have the same meanings as defined above, or a sulton derived from a hydroxy sulfonic acid of formula —HO—$R^3$—$SO_2OH$, wherein $R^3$ has the same meaning as defined above, or a primary or secondary amine or a hydroxy compound of formula $R^{2''}$—OH, wherein $R^{2''}$ has the same meaning as defined above, as well as with 5 to 15 moles of epichlorohydrin or a bisepoxy derivative of formula (II), wherein $R^6$ has the same meaning as defined above, in the presence of 5 to 20 moles of an alkali metal or alkali-earth metal hydroxide and 2.5 to 3.5 l of water.

(c) Calculated on 1 mole of the cyclodextrin the α-, β- or γ-cyclodextrin is reacted with 5 to 15 moles of an alkali metal or alkali-earth metal hydroxide, 2.5 to 3.5 l of water and 5 to 15 moles of epichlorohydrin or a bisepoxy derivative of formula (II), wherein $R^6$ has the same meaning as defined above in a manner known per se and the cyclodextrin polymer solution obtained is reacted calculated on 1 mole of the cyclodextrin contained therein with 0.1 to 7 moles of a halogen derivative of formula $R^{2''}$—Hal, wherein $R^{2''}$ and Hal have the same meanings as defined above, or a sulton derived from a hydroxy sulfonic acid of formula HO—$R^3$—$SO_2OH$, wherein $R^3$ has the same meaning as defined above, in the presence of 0.2 to 14 moles alkali metal or alkali-earth metal hydroxide.

(d) For preparing cyclodextrin polymers having structural units of formula (I), which contain in place of $R^2$ and/or $R^{2'}$ the inorganic or organic acyl groups stated above, the α-, β- or γ-cyclodextrin is reacted calculated on 1 mole of the cyclodextrin with 5 to 15 moles of an alkali metal or alkali-earth metal hydroxide, 2.5 to 3.5 l of water and 5 to 15 moles of epichlorohydrin or bisepoxy derivative of formula (II), wherein $R^6$ has the same meaning as defined above, in a manner known per se and the cyclodextrin polymer obtained is reacted under heating with the corresponding inorganic or organic acid ahydride in the presence of an organic solvent and/or acid binding agent or with the salt of the corresponding acid in the absence of an organic solvent and/or acid binding agent.

From the reaction mixture containing the cyclodextrin polymer substituted by ionic groups, obtained by anyone of the processes (a) to (d) the by-products of low molecular weight, the salts dissolved and the water are removed and so the solid polymer is obtained.

In the process according to the invention the cyclodextrin polymer substituted by ionic groups is obtained in form of its aqueous solution. In certain cases, when the aqueous solution of the complex is needed, this crude reaction mixture may also be used after removing the salts and the by-products of low molecular weight. In other cases, when the solid polymer should be used, the polymer has to be obtained from the salt-free reaction mixture by removing the water.

The removing of the salts and the by-products of low molecular weight may be performed perferably with dialysis. During the dialysis not only the salts but also the by-products of low molecular weight will be removed from the reaction mixture so products of greater purity may be obtained by evaporating the dialysate.

In the process according to the invention α-, β- or γ-cyclodextrin may be used as cyclodextrin. Depending on the type of the cyclodextrin, "guest molecules" of smaller or greater size may be incorporated into the product obtained.

Both the polymerization and most of the substitution reactions according to the invention proceed in alkaline medium. The alkaline reaction may be achieved by using alkali metal or alkali-earth metal hydroxides, such as sodium hydroxide, potassium hydroxide, calcium hydroxide or barium hydroxide. Sodium hydroxide is preferred.

For connecting the cyclodextrin rings and forming the hydroxyalkyl side-chains cross-linking agents, such as epichlorohydrin or a bisepoxy derivative of formula (II) may be used. Preferred bisepoxy derivatives are bisepoxypropyl ether, 1,2,3,4-bisepoxybutane, ethylenglycol bisepoxypropyl ether and 1,4-bisepoxypropoxybutane. All of the above compounds are suitable for forming the polymer structure desired. The compact or loose structure of the polymers obtained depends also on the length of chaines of the cross-linking agent.

According to the process of the invention halogen derivatives of formula $R^{2''}$—Hal or hydroxy compounds of formula R$^{2'''}$—OH may be used for introducing the ionic groups. These are depending on the meaning of R$^{2''}$ halogen carboxylic acids, such as chloroacetic acid, chloropropionic acid, bromoacetic acid, chlorosuccinic acid, bromosuccinic acid, 2-chloro-isobutyric acid, 2-bromo-isobutyric acid, 2-chloro-1,2,3-tricarboxy-propane or 2-bromo-1,2,3-tricarboxy-propane; sulfonic acids, such as chloromethane sulfonic acid, 3-chloropropane sulfonic acid; amino hydrocarbons, such as 3-dimethylamino-chloropropane or hydroxy carboxylic acids, hydroxy sulfonic acids or hydroxy amines. By using these reagents R$^3$ substituents containing one or more carboxy, sulfo or amino groups may be introduced into the polymer.

Using the sultons derived from hydroxy sulfonic acids of formula HO—R$^3$—SO$_2$OH R$^3$ substituents substituted by sulfo groups may be introduced into the molecule.

When according to the invention halogen derivatives of formula R$^{2''}$—Hal, wherein R$^{2''}$ stands for an aminoalkyl group of formula —R$^3$—(NR$^4$R$^5$)$_u$ and the substituents R$^4$ and/or R$^5$ are substituted by halogen atom, are used, products are obtained in which two or three R$^2$ substituents represent an —R$^3$—NR$^4$—R$^3$— or (—R$^3$—)$_3$N group. Two or three structural units of formula (I) may also be connected with one, two or three groups mentioned above.

When according to process (b) primary or secondary amins are introduced into the reaction mixture, polymers containing on place of X a secondary or tertiary amino group are obtained.

When polymers, which contain in place of R$^2$—PO(OH)$_2$ or —SO$_2$OH group or on the end carbon atom nearer to the polymer chain an organic acyl group of formula —R$^3$—(COOH)$_u$ substituted by an oxo group, are to be produced, the polymers which are unsubstituted in these places are acylated with an inorganic or an organic acid anhydride. The inorganic and organic acid anhydrides, which may be applied, are e.g. sulfur trioxide, phosphorus pentoxide, succinic anhydride and adipinic anhydride. The anhydrides may be used also in the presence of an acid binding agent or in form of their complexes (adducts). So as to avoid the side reactions, the reaction is preferably conducted at low temperature or is performed in the presence of an organic solvent.

The acyl group corresponding to the phosphorus acid may be introduced also into the polymer when the polymer is heated in the presence of a phosphorus salt. Such phosphorus salts are e.g. alkali metal phosphates, such as sodium dihydrogen phosphate, disodium hydrogen phosphate or sodium pyrophosphate.

In process (a) of the invention polymers with lower, in processes (b) to (d) those with higher molecular weight may be produced.

The polymers according to the invention containing the structural units of formula (I) are of high molecular weights. They may be used within broad limits in the industry as a consequence of their inclusion complex and salt forming properties. They may be applied advantageously while forming and stabilizing colloidal disperse systems, e.g. in the production of several emulsions and suspensions of the photochemical industry.

The cyclodextrin polymers substituted by ionic groups may be used preferably for chromatographic separation of non-ionic compounds on ion exhange columns. The substance capable of forming inclusion complex will be eluted delayed in form of a complex together with the cyclodextrin polymer so the principles of the ion exchange and inclusion chromatography get across together.

The invention is further shown by the following Examples without any limitation thereto.

EXAMPLE 1

Water soluble β-cyclodextrin polymer containing carboxymethyl group

In 27.4 g (22 ml, 0.16 moles) of 23.3% sodium hydroxide solution 15 g (0.16 moles) of chloroacetic acid and 25 g (0.022 moles) of β-cyclodextrin are dissolved at ambient temperature. To the solution 22 ml (0.1 mole) of 23.3% sodium hydroxide solution is added dropwise during 2.5 hours. The reaction mixture is heated to 60° C. and stirred for an 1 hour. 8.8 g (0.22 moles) of sodium hydroxide are dissolved in 28 ml of water thereafter added to the reaction mixture whereafter 17.3 ml (20.4 g, 0.22 moles) of epichlorohydrin are added during 1.5 hours and the reaction mixture is stirred for 0.5 hour at 60° C. The 102 ml reaction mixture cooled to ambient temperature contains 0.38 moles of sodium chloride. The reaction mixture is dialysed saltfree. The volume of the dialysate is 655 ml, its dry substance content is 5.1%. 32.5 g product is obtained by lyophilization. Its cyclodextrin content determined by iodometry is 56.4% (Acta Chim. Hung., 100, 265 (1979)), the carboxy content determined by the titration with 0.02 N sodium hydroxide solution is 9.2%, this corresponds to 4.1 equivalents of carboxy groups per cyclodextrin unit. Average molecular mass: 2,200 (according to the molecular mass distribution determined by gel chromatography).

EXAMPLE 2

Water soluble α-cyclodextrin polymer containing carboxymethyl group

In 71 g (57 ml, 0.44 moles) of 25% sodium hydroxide solution 42 g (0.44 moles) of chloroacetic acid and 100 g (0.10 mole) of α-cyclodextrin are dissolved at ambient temperature. To the solution 57 ml (0.44 moles) of 25% sodium hydroxide solution is added dropwise during 2.5 hours. The reaction mixture is heated to 40° C. and stirred for an hour. 35.2 g (0.88 moles) of sodium hydroxide are dissolved in 170 ml of water and added to the reaction mixture, whereafter 69 ml (81.4 g, 0.88 moles) of epichlorohydrin are added during 1.5 hours. The reaction mixture is stirred for 0.5 hour at 60° C. The 420 ml reaction mixture obtained, which contains 1.32 moles of sodium chloride, is dialysed. The volume of the dialysate is 2,120 ml, dry substance content: 6.3%. By lyophilization 133.5 g solid product are obtained. Cyclodextrin content: 57.3%, carboxy content: 7.3%, this corresponds to 2.8 equivalents of carboxy group per cyclodextrin unit. Average molecular mass: 2,350.

EXAMPLE 3

Water soluble γ-cyclodextrin polymer containing carboxymethyl group 60 g (1.5 moles) of sodium hydroxide are dissolved in 540 ml of water. In this solution 142 g (1.5 moles) of chloroacetic acid and 855 g (0.66 moles) γ-cyclodextrin are dissolved at ambient temperature. To the reaction mixture 240 g (1.5 moles) of 25% sodium hydroxide solution is added dropwise at the same temperature during 2.5 hours. The reaction mixture is heated to 60° C. and stirred for an hour. 1,450 g (7.5 moles) of 20.7% sodium hydroxide solution are added, thereafter 588 ml (694 g, 7.5 moles) of epichlorohydrin are added during 1.5 hours and the reaction mixture is stirred for 0.5 hour thereafter cooloed. The 3,000 ml reaction mixture is acidified with 300 ml 5 N hydrochloric acid and dialysed saltfree. By lyophilization 1,015 g product are obtained. Cyclodextrin content: 54.2%, carboxy content: 3.8%, this corresponds to 2.0 equivalents of carboxy group per cyclodextrin unit. Average molecular mass: 2,560.

EXAMPLE 4

Water soluble β-cyclodextrin polymer containing carboxymethyl group

In 1,920 g (10.5 moles) of 21.9% sodium hydroxide solution 850 g (0.75 moles) of β-cyclodextrin are dissolved at 60° C. 142 (1.5 moles) chloroacetic acid are dissolved in 520 ml of water and added to the alkaline solution, thereafter 588 ml (694 g, 7.5 moles) of epichlorohydrin are added dropwise during 1.5 hours. The reaction mixture is stirred 1 hour at 60° C., then cooled. The 3,300 ml reaction mixture obtained is acidified with 5 N hydrochloric acid and dialysed saltfree. 1,010 ml of the lyophilized substance are obtained. Cyclodextrin content: 56.2%, carboxy content: 3.4% this corresponds to 1.5 equivalents of carboxy group per cyclodextrin unit. Average molecular mass: 4,970.

EXAMPLE 5

Water soluble β-cyclodextrin polymer containing dimethylamino group

In 2,014 g (7.6 moles) of 15.1% sodium hydroxide solution 720 g (0.63 moles) of β-cyclodextrin are dissolved at 40° C. and 104.5 g (1.3 moles) of dimethylammonium chloride are added thereafter 496 ml (585 g, 6.3 moles) of epichlorohydrin are added during 1.5 hours. The reaction mixture is stirred at the same temperature for an hour. From the solution dialysed saltfree 730 g of the product are obtained by lyophilization. Cyclodextrin content: 54.3%, nitrogen content: 1.45%, this corresponds to 2.1 equivalents of dimethylamino group per cyclodextrin unit. Average molecular mass: 4,300.

EXAMPLE 6

Water soluble β-cyclodextrin polymer containing sulfopropyloxy group 11.34 g (0.01 mole) of β-cyclodextrin is suspended in 30 ml of 50% sodium hydroxide solution, then 1.22 g (0.01 mole) of propane sulton are added. The reaction mixture is maintained for 1 day at 50° C. while stirring sometimes. 30 ml of distilled water are added and to the solution obtained 8.6 ml (10.2 g, 0.11 moles) of epichlorohydrine are added dropwise during 1.5 hours. The reaction mixture is stirred at the same temperature for an hour then cooled. From the solution dialysed saltfree 14.5 g of the product are obtained. Cyclodextrin content 49.5%, sulfur content: 1.6%, average molecular mass: 4,860.

EXAMPLE 7

Water soluble β-cyclodextrin polymer containing carboxymethyl group

In 3,300 g (5.75 moles) of 6.9% sodium hydroxide solution 1,285 g (1.13 moles) of β-cyclodextrin and 213.5 g (2.26 moles) of chloroacetic acid are dissolved at 80° C. Thereafter 450 ml (531 g, 5.74 moles) of epichlorohydrin are added dropwise during 1.5 hours. The reaction mixture is stirred 0.5 hour at the same temperature. So 780 g of saltfree, lyophilized product are obtained. Cyclodextrin content: 58.5%, carboxy content: 2.9%, this corresponds to 1.3 equivalents of carboxy group per cyclodextrin unit. Average molecular mass: 2,800.

EXAMPLE 8

Water soluble β-cyclodextrin polymer containing carboxymethyl group

In 340 g (1.0 mole) of 11.8% sodium hydroxide solution 100 g (0.088 moles) of β-cyclodextrin and 0.8 g (0.009 moles) of chloroacetic acid are dissolved at 60° C., then 103.5 ml (1.32 moles, 122.1 g) of epichlorohydrin are added dropwise. The reaction mixture is stirred for an hour at the same temperature. So 160 g of saltfree, lyophilized product are obtained. Cyclodextrin content: 45%, carboxy content: 0.1%, this corresponds to 0.06 equivalents of carboxy group per cyclodextrin unit. Average molecular mass: 4,760.

EXAMPLE 9

Water soluble β-cyclodextrin polymer containing carboxymethyl group

In 65.3 g (0.22 moles) of 13.5% sodium hydroxide solution 25 g (0.022 moles) of β-cyclodextrin are dissolved and 17.3 ml (20.4 g, 0.22 moles) of epichlorohydrin are added dropwise at 60° C. during 1.5 hours. Thereafter 4.2 g (0.044 moles) of chloroacetic acid dissolved in 4.4 g (0.044 moles) of 40% sodium hydroxide solution are added whereafter 4.4 g (0.044 moles) of 40% sodium hydroxide solution are added dropwise during 2 hours. So 26 g of saltfree, lyophilized product are obtained. Cyclodextrin content 55.9% carboxy content: 0.3%, this corresponds to 0.14 equivalent of carboxy group per cyclodextrin unit. Average molecular mass: 5,100.

EXAMPLE 10

Water soluble β-cyclodextrin polymer containing carboxymethyl group

In 250 ml of 1 N sodium hydroxide solution 100 g (0.088 moles) of β-cyclodextrin are dissolved at 60° C., then 77.5 g (0.45 moles) of ethylene glycol diepoxypropyl ether are added during 1.5 hours. In the reaction mixture obtained 8.3 g (0.088 moles) of chloroacetic acid are dissolved and stirred for an hour at the same temperature. So 90 g of saltfree, lyophilized product are obtained. Cyclodextrin content: 58%, carboxy content: 1.8%, this corresponds to 0.8 equivalents of carboxy group per cyclodextrin unit. Average molecular mass: 4,500.

EXAMPLE 11

Acidic succinic acid ester of α-cyclodextrin polymer 9.35 g of the dialysed, dried α-cyclodextrin polymer, which contains 52% (4.86 g, 6 mmoles) of α-cyclodextrin chemically bound and has an average molecular mass of 4,400, are dissolved in 40 ml of abs. pyridine in a round bottom flask equipped with a chlorocalcium unit. To the solution 1.6 g (16 mmoles) of succinic anhydride are added, then dissolved on hot water bath under shaking and the solution obtained is maintained hot for 2 hours. The great part of pyridine is distilled off in vacuo. To the residue 300 ml of water is added and the remaining part of the pyridine is distilled off with steam, The remaining aqueous solution is dialysed against distilled water, then dried by lyophilization. So 9.37 g of lyophilized, solid, water soluble polymer are obtained which has an α-cyclodextrin content of 47.2%, a free carboxy content of 1.9 eqivalent/mole α-cyclodextrin. Average molecular mass: 4,900.

EXAMPLE 12

Acidic adiinic acid ester of β-cyclodextrin 11.56 g of the dialysed and dried β-cyclodextrin polymer, which contain 54% (6.24 g, 5.5 moles) of β-cyclodextrin chemically bound and has an average molecular mass of 4,800, are dissolved in 50 ml of abs. pyridine and reacted with 2.3 g (18 moles) of adipinic anydride for 3 hours as described in Example 11. In the same way, using dialysis and lyophilization 11.6 g of solid, water soluble polymer are obtained, which has a β-cyclodextrin content of 49%, a free carboxy content of 1.7 equivalent/mole β-cyclodextrin. Average molecular mass: 5,200.

EXAMPLE 13

Acidic phosphorus acid ester of β-cyclodextrin

In the neutral (pH=7), concentrated aqueous solution of 12.6 g of β-cyclodextrin (which contains 54% of β-cyclodextrin chemically bound and has an average molecular mass of 4,100) 7.3 g of sodium dihydrogen phosphate monohydrate and 10.6 g of disodium hydrogen phosphate heptahydrate are dissolved. The solution is evaporated to dryness and the residue is heated 3 hours on an oil bath of 150° C., thereafter cooled, dissolved in distilled water, dialysed against distilled water and lyophilized. So 11.1 g of solid, water soluble polymer are obtained which has a chemically bound β-cyclodextrin content of 52%, a phosphorus content of 1.5% and an average molecular mass of 4,800.

EXAMPLE 14

Acidic sulfuric acid ester of γ-cyclodextrin 15 g of triethyl amine-sulfur trioxide complex are added to 200 ml of dimethyl formamide, then 7.8 g dry γ-cyclodextrin polymer, which has a γ-cyclodextrin content of 50% and an average molecular mass of 6,800, are dissolved under stirring at 0° C. The solution is maintained for 24 hours at 0° C. thereafter diluted threefold while continuing cooling, dialysed against distilled water and lyophilized. So 6.8 g of solid, water soluble product are obtained which has a chemically bound γ-cyclodextrin content of 47%, a sulfur content of 2.5% and an average molecular mass of 6,600.

We claim:

1. Process for the preparation of water soluble cyclodextrin polymers substituted by ionic groups, containing structural units of formula (I)

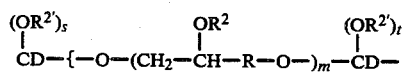

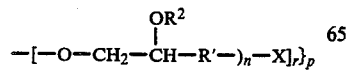

wherein

CD stands for a group obtained from α-, β- or γ-cyclodextrin by a cleaving p+s or 1+t+r hydroxy group, R and R' stand independently for —CH$_2$—, —CHOH—CH$_2$—, —CH$_2$—O—(CH$_2$)$_2$—O—CH$_2$—CHOH—CH$_2$—, —CH$_2$—O—CH$_2$—CHOH—CH$_2$—, —CH$_2$—O—(CH$_2$)$_4$—O—CH$_2$—CHOH—CH$_2$—, X stands for a secondary or tertiary amino or —OR$^1$ or —OR$^2$, wherein R$^1$ stands for hydrogen or when r is other than O, a group obtained from α-, β-, or γ-cyclodextrin by cleaving a hydroxy group, R$^2$ are the same or different and stand for hydrogen, —PO(OH)$_2$—, —SO$_2$OH—, —R$^3$—(COOH)$_u$, —R$^3$—(SO$_2$OH)$_u$, —R$^3$—(NR$^4$R$^5$)$_u$, or a group obtained from α-, β- or γ-cyclodextrin by cleaving a hydroxy group or one, two or three R$^2$ substituents together from an R$^3$—NR$^4$—R$^3$— or (—R$^3$—)$_3$N group, R$^{2'}$ has the same meaning as R$^2$ excepting the groups obtained from cyclodextrin molecules, R$^3$ stands for u+1 groups obtained from an alkane or an araliphatic hydrocarbon having 1 to 10 carbon atoms, the end carbon atom standing nearer to the polymeric chain of which is unsubstituted or substituted by an oxo group, R$^4$ and R$^5$ stand independently for hydrogen, alkyl having 1 to 4 carbon atoms unsubstituted or substituted by halogen, aryl having 6 to 10 carbon atoms or aralkyl or alkylaryl groups being obtainable by the combination thereof, m and n stand independently for an integer from 1 to 10, r stands for an integer from 0 to 23, p stands for an integer from 1 to 24, s and t stand independently for an integer from 0 to 7, u stands for an integer from 1 to 5, wherein m, n, r, t, and u can differ also in the side-chains within a unit and when CD stands for a group obtained from α-cyclodextrin, then p+s≦18 and r+5 ≦17 and when CD stands for a group obtained from β-cyclodextrin, then p+s≦21 and r+t≦20 and when CD stands for a group obtained from γ-cyclodextrin, then p+s≦24 and r+t≦23, or the aqueous solutions thereof characterized in that (a) calculated on 1 mole of the cyclodextrin, the α-, β- or γ-cyclodextrin is reacted with 0.1 to 7 moles of a halogen derivative of formula R$^{2''}$-Hal, wherein Hal stands for halogen and R$^{2''}$ has the same meaning as R$^{2'}$ except hydrogen, —PO(OH)$_2$ and —SO$_2$OH, or 0.1 or 7 moles of a sulfone derived from a hydroxy sulfonic acid of formula HO—R$^3$—SO$_2$OH, wherein R$^3$ has the same meaning as defined above, in the presence of 0.2 to 14 moles of an alkali metal or an alkali-earth metal hydroxide in 0.7 to 1.0 liter of water, the reaction mixture containing the cyclodextrin substituted by ionic groups is reacted calculated on 1 mole of the cyclodextrin contained therein with 5 to 15 moles of epichlorohydrin or a bisepoxy derivative of formula (II)

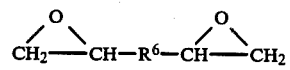

wherein $R^6$ stands for a direct bond or $-CH_2-O-CH_2-$, $-CH_2-O-CH_2-CH_2-O-CH_2-$ or $-CH_2O-(CH_2)_4-O-CH_2-$. after adding 5 to 15 moles of an alkali metal or alkali-earth metal hydroxide and 1.8 to 2.5 liter of water at a temperature of 40° to 80° C., or (b) calculated on 1 mole of the cyclodextrin the $\alpha$-, $\beta$- or $\gamma$-cyclodextrin is reacted with 0.1 to 7 moles of a halogen derivative of formula $R^{2''}$-Hal, wherein $R^{2''}$ and Hal have the same meanings as defined above, or a sulfone derived from a hydroxy sulfonic acid of formula $HO-R^3-SO_2OH$, wherein $R^3$ has the same meaning as defined above, or a primary or secondary amine or a hydroxy compound of formula $R^{2''}-OH$, wherein $R^{2''}$ has the same meaning as defined above, as well as with 5 to 15 moles of epichlorohydrin or a bis epoxy derivative of formula (II), wherein $R^6$ has the same meaning as defined above, in the presence of 5 to 20 moles of an alkali metal or alkali-earth metal hydroxide and 2.5 to 3.5 liter of water, or (c) claculated on 1 mole of the cyclodextrin the $\alpha$-, $\beta$- or $\gamma$-cyclodextrin is reacted with 5 to 15 moles of an alkali metal or alkali-earth metal hydroxide, 2.5 to 3.5 liter of water and 5 to 15 moles of epichlorohydrin or a bisepoxy derivative of formula (II), wherein the cyclodextrin polymer solution obtained is reacted calculated on 1 mole of the cyclodextrin contained therein with 0.1 to 7 moles of a halogen derivative of formula $R^{2''}$-Hal, wherein $R^{2''}$ and hal have the same meanings as defined above, or a sulfone derived from a hydroxy sulfonic acid of formula $HO-R^3-SO_2OH$, wherein $R^3$ has the same meaning as defined above, in the presence of 0.2 to 14 moles alkali metal or alkali-earth metal hydroxide, or (d) for preparing cyclodextrin polymers having structural units of formfula (I), which contain on place of $R^2$ and/or $R^{2'}$ the inorganic or organic acyl groups stated above, the $\alpha$-, $\beta$- or $\gamma$-cyclodextrin is reacted, calculated on 1 mole of the cyclodextrin with 5 to 15 moles of an alkali metal or alkali-earth metal hydroxide, 2.5 to 3.5 liter of water and 5 to 15 moles of epichlorohydrin or bisepoxy derivative of formula (II), wherein $R^6$ has the same meaning as defined above, and the cyclodextrin polymer obtained is reacted under heating with the corresponding inorganic or organic acid anhydride in the presence of an organic solvent and/or acid binding agent or with the salt of the corresponding acid in the absence of an organic solvent and/or acid binding agent, and from the reaction mixture containing the cyclodextrin polymer substituted by ionic groups, obtained by anyone of the processes (a) to (d) the by-products of low molecular weight, the salts dissolved and the water are removed and so the solid polymer is obtained.

2. Process according to claim 1 for the preparation of water soluble $\alpha$-cyclodextrin polymers substituted by ionic groups characterized in that $\alpha$-cyclodextrin or unsubstituted $\alpha$-cyclodextrin polymer is used.

3. Process according to claim 1 for the preparation of water soluble $\beta$-cyclodextrin polymers substituted by ionic groups characterized in that $\beta$-cyclodextrin or unsubstituted $\beta$-cyclodextrin polymer is used.

4. Process according to claim 1 for the preparation of water soluble $\gamma$-cyclodextrin polymers substituted by ionic groups characterized in that $\gamma$-cyclodextrin or unsubstituted $\gamma$-cyclodextrin polymer is used.

5. Process according to claim 1 for the preparation of polymers containing structural units of formula (I) having $-O-CH_2-COOH$ group on place X and/or $-O-R^2$ and/or $-O-R^{2'}$ characterized in that chloroacetic acid is used as halogen derivative of formula $R^{2''}$-Hal.

6. Process according to claim 1 for the preparation of polymers containing structural units of formula (I) having $-O-CH_2-CH_2-CH_2-SO_2OH$ group in place of X and/or $-O-R^2$ and/or $-O-R^{2'}$ characterized in that propane sulton is used as a sulton derived from a hydroxy sulfonic acid of formula $HO-R^3-SO_2OH$.

7. Process according to process (b) of claim 1 for the preparation of polymers containing structural units of formula (I) having $-N(CH_3)_2$ group on place of X characterized in that dimethyl amine is used as secondary amine.

8. Process according to process (d) of claim 1 for the preparation of cyclodextrin polymers containing structural units of formula (I) having $-CO-CH_2-CH_2-COOH$ organic acyl group on place of $R^2$ and/or $R^{2'}$ characterized in that succinic anhydride is used as organic acid anhydride.

9. Process according to process (d) of claim 1 for the preparation of cyclodextrin polymers containing structural units of formula (I) having $-CO-(CH_2)_4-COOH$ organic acyl group on place of $R^2$ and/or $R^{2'}$ characterized in that adipinic anhydride is used as organic acid anhydride.

10. Process according to process (d) of claim 1 for the preparation of cyclodextrin polymers containing structural units of formula (I) having $-SO_2OH$ inorganic acyl group on place of $R^2$ and/or $R^{2'}$ characterized in that sulfur trioxide is used in from its complex with triethyl amine as inorganic acid anhydride.

11. Process according to process (d) of claim 1 for the preparation of cyclodextrin polymers containing structural units of formula (I) having $-PO(OH)_2$ inorganic acyl group on place of $R^2$ and/or $R^{2'}$ characterized in that the unsubstituted cyclodextrin polymer is reacted under heating with the mixture of sodium dihydrogen phosphate and disodium hydrogen phosphate.

12. Process according to claim 1 wherein epichlorohydrin is used for cross-linking the cyclodextrin.

13. Process according to claim 1 wherein ethylene glycol bisepoxypropyl ether is used for cross-linking the cyclodextrin.

14. A cyclodextrin polymer substituted by ionic groups containing structural units of formula (I), wherein CD, R, R', X, $R^2$, $R^{2'}$, m, n, p, r, s and t have the same meanings as defined in claim 1.

* * * * *